(12) United States Patent
Cangiano

(10) Patent No.: US 8,157,911 B2
(45) Date of Patent: Apr. 17, 2012

(54) HIGH PERFORMANCE CONCRETE WITH A QUICK RESISTANCE DEVELOPMENT LACKING ADDED MATERIALS WITH LATENT HYDRAULIC ACTIVITY

(75) Inventor: Stefano Cangiano, Torre de Roveri (IT)

(73) Assignee: Italcemeti S.p.A., Bergamo (IT)

( * ) Notice: Subject to any disclaimer, the term of this patent is extended or adjusted under 35 U.S.C. 154(b) by 871 days.

(21) Appl. No.: 11/920,467

(22) PCT Filed: May 19, 2006

(86) PCT No.: PCT/EP2006/062441
§ 371 (c)(1),
(2), (4) Date: Nov. 15, 2007

(87) PCT Pub. No.: WO2006/122976
PCT Pub. Date: Nov. 23, 2006

(65) Prior Publication Data
US 2009/0229495 A1    Sep. 17, 2009

(30) Foreign Application Priority Data
May 19, 2005  (IT) .................. MI05A0913

(51) Int. Cl.
*C04B 7/06* (2006.01)
(52) U.S. Cl. .............. 106/713; 106/737; 106/738
(58) Field of Classification Search .......... 106/713, 106/737, 738
See application file for complete search history.

(56) References Cited

U.S. PATENT DOCUMENTS

| | | | |
|---|---|---|---|
| 3,366,720 A | 1/1968 | Huber | 264/122 |
| 7,316,743 B2 * | 1/2008 | Cangiano | 106/713 |
| 2005/0061208 A1 | 3/2005 | Sapozhnikov | 106/816 |

FOREIGN PATENT DOCUMENTS

| | | |
|---|---|---|
| FR | 2703677 | 10/1994 |
| GB | 2377930 | 1/2003 |
| WO | WO03/043947 | 5/2003 |

OTHER PUBLICATIONS

S. Rols, et al. "Influence of Ultra-Fine Particle Type on Properties of Very-High-Strength Concrete"; 1999; pp. 671-685.
V. S. Ramachandran, et al. "Durability of Building Materials"; 1986 vol. 4; pp. 45-66.
P.-C. Aïcin. "High Performance Concrete"; p. 191.
S. P Jiang, et al. "Effect of Fillers (Fine Particles) on the Kinetics of Cement Hydration"; 1993; pp. 132-137.
W. Jiang, et al. "Phosphate-Bonded Dental Cements"; 1992; pp. 338-344.
Von S. Sprung, et al. "Assessment of the Suitability of Limestone for Producing Portland Limestone Cement"; Jan. 1991; pp. 1-12.

(Continued)

*Primary Examiner* — Paul Marcantoni
(74) *Attorney, Agent, or Firm* — Ohlandt, Greeley, Ruggiero & Perle, L.L.P.

(57) ABSTRACT

Solid mixture for the preparation of concrete which after 16 hours has a mechanical resistance higher or equal to 50 MPa comprising cement and limestone aggregates, substantially lacking latent hydraulic activity, characterized by the presentation of a specific granulometric distribution curve.

19 Claims, 7 Drawing Sheets

OTHER PUBLICATIONS

Written Opinion dated Apr. 2005 based on PCT application No. PCT/EP2006/062441.
Slanicka, A.: "*Rapid-Hardening Hydraulic Mixture Especially for Mine Shaft Reinforcement*," vol. 23, No. 28325, Jan. 23, 1989, p. 287 (Abstract Only).
Moreno, T.: "*White Concrete Compositions Containing Calcium Carbonate and Portland Cement*," vol. 115, No. 213711n, Nov. 18, 1991, p. 372 (Abstract Only).
International Search Report dated Oct. 26, 2006 based on PCT application No. PCT/EP2006/062441.

* cited by examiner

HIGH PERFORMANCE CONCRETE WITH A QUICK RESISTANCE DEVELOPMENT LACKING ADDED MATERIALS WITH LATENT HYDRAULIC ACTIVITY

BACKGROUND

1. Field of the Disclosure

The present disclosure concerns the making of high performance concrete obtainable without significant quantities of added materials with latent hydraulic activity, in particular silica fume.

2. Discussion of the Background Art

Before describing in detail the present disclosure it would be proper to define the meaning of some terms and refer to the state of the art gathered by reading technical and patent bibliography on the subject.

Currently the expression "high performance" refers to a rather large range of usable characteristics of cement mixtures and in particular the rheological and mechanical performances.

With regards to the rheological performance, a high performance concrete is generally required to have at least a thixotropical or, preferably, a self-compacting behaviour.

With regards to the mechanical performance, the expression "high performance" refers to resistance to a large range of mechanical stress. According to the guide-lines of the Italian Ministry of Public Works inistry concretes can be classified as high performance concrete (HPC) if they are characterised by a water/cement ratio of <0.45 and a characteristic cubic resistance at 28 days of between 55 MPa and 75 MPa, or as High resistance concrete (AR) if characterized by a water/cement ratio of <0.35 and a characteristic cubic resistance of between 75 MPa and 115 MPa. In this disclosure, the term "high performance" includes the HPC concrete and AR concrete.

It is well known that, in order to obtain high performance concrete, it is necessary to adopt a reduced water/binder ratio (by binder we mean Portland cement and any other suitable material) and a dosage of binder generally higher than that required for a concrete with normal resistance.

The present European standards for concrete (EN 206-1) allow the addition to the concrete of materials finely subdivided in order to obtain or improve some proprieties. The EN 206-1 takes into account two types of additions:

- The additions which are nearly inert (type I), from among which it is possible to mention limestone;
- The additions with a pozzolanic activity or a latent hydraulic activity (type II) are the fly ash in conformity with standard EN 450 and silica fume in conformity with standard EN 13263.

It is well known that high performance concrete can be produced starting from a great variety of cement systems such as:

- pure Portland cement;
- Portland cement and fly ash;
- Portland cement and silica fume;
- Portland cement, slag and silica fume;

According to data found in literature, nearly all high performance concrete contain silica fume.

There have been numerous studies on the effects of silica fume on the hydration reactions of cement systems. It is well known that the action of silica fume manifests itself as a pozzolanic addition and as a filler. The action of silica fume as a granular filling material amongst the cement particles is explained by virtue of its extremely reduced dimensions (between 30 and a 100 times smaller that those of Portland cement).

As a counterpoint to the advantages of using such additional material, one must point out that the addition of silica fume, in some cases, seems to cause an increase in the shrinkage in the plastic phase and can bring about noticeable phenomena of micro-cracks/SP 186-39 page 671 (E& FN SPON—Modern Concrete Technology 5-4 page 191 Ed. 1998) and (S. Rols et al. "Influence of Ultra Fine Particle Type on Properties of Very—High strength Concrete ACI SP 186 page 671-685—Proceedings of Second CANMET/ACI International Conference, RS, Brazil, 1999). There have also been indications of an unexpected resistance downgrading over the long period that can bring about a deterioration of the material. One must finally point out that the use of silica fume is particularly expensive.

With regards to the limestone filler, it has for a long time been considered as inert. Although it cannot be considered as a pozzolanic addition material, many studies have shown that it has a significant reactivity in the medium and long term. S. Sprung, E. Siebel " . . . " Zement Kalk Gibs 1991, N. 1, page. 1-11 hypotheses that, in addition to its main role as matrix filler, the limestone filler could bring about a certain chemical reaction with aluminates to produce the formation of calcium aluminates. Ramachandran et al. (Ramachandran et al. In "Durability of Buildings Materials", 4 1986) have observed that the addition of $CaCO_3$ to $C_3S$ (silicate tricalcium) accelerates the hydration. Furthermore, they have found that the hydration of the cement is accelerated by the limestone filler effect. In the cement mixture, $CaCO_3$ would produce a calcium aluminate that would be incorporated in the phases $C_3S$ and $C_3A$ (aluminous tricalcium) during the hydration. S. P. JIANG et al. ("Effect of fillers (Fine particles) on the Kinetics of Cement Hydration $3^{rd}$ Beijing International Symposium on Cement and Concrete, 1993, 3) have furthermore shown that the formation of calcium aluminate is beneficial because it would increase the resistance and accelerate the hydration process. According to Jiang et al. (S. P. Jiang et al. 9th International Congress of Cem. Chem. New Delhi, 1992) the limestone filler would act on the hydration kinetics of cement. According to such authors, the acceleration of the hydration can be attributed, rather than to what has been described above, to a multiplication effect of the inter-particles contacts and to the nature of such contacts on the surface of the limestone filler.

With regards to the high performance, from a rheologic point of view, it is well known that the self-compacting concrete is becoming important.

The self-compacting concrete (SCC) is a special concrete capable of flowing, by the sole reason of its own weight, in the formworks and to flow around obstacles, such as the reinforcement bars, without stopping and giving place to separation of its constituents. Its rheological characteristics must be preserved until the setting and hardening process starts.

According to the AFGC (Association Francaise de Genie Civil) the auto-compacting concrete must satisfy the following requisites when fresh:

a) The values of expansion of Slump Flows (slump cone) must fall generally in a field between 60 and 75 cm (with no visible segregation at the end of the test—that is to say no lime wash aureole along the external perimeter and no concentration in the centre);
b) the filling ratio of the equipment denominated L-Box must be higher than 80%;
c) the concrete must not show segregation and must present a limited bleeding.

A patent application (MI2001A002480) has been filed regarding concrete having a 28 days mechanical resistance higher or equal to 110 MPa comprising cement in conformity with the European standard 197-1, limestone aggregates and additives, characterized by the fact that any additions with latent hydraulic activity are lower than 5% with respect to the weight of the cement.

Concretes according to the Italian patent application MI2001A002480 were characterized by the following characteristics:
1) the absence of significant quantities of additions of type II (for example silica fume)
2) 28 days mechanical resistance higher than 110 MPa and/or a development of the mechanical compression resistance so as to guarantee the values shown in the following table

TABLE I performance requirements in terms of the mechanical resistance development.

| Expiry [days] | 1 | 2 | 28 |
|---|---|---|---|
| Rc [MPa] | ≧50 | ≧80 | ≧110 |

3) cement quantity between 25% and 50% in weight with regards to the total weight of the solid mixture.
4) limestone aggregates having a D. Max between 2 and 12 mm.

These characteristics were reached by using a granulometric curve of the solid mixture which is quite different from those previously known in art.

Although they present remarkable advantages, concretes thus obtained have proved to have a limited industrial desirability due to an excessively high cement dosage that, apart from being responsible for temperature rises from which self-tensioning can arise, can provoke relevant phenomena of autogenous shrinkage and an undesirable increase in costs.

It is therefore desirable to have a concrete that maintains the performance of the above mentioned patent (MI200A002480) and still maintain significantly lower the quantities of cement. More specifically, for many production applications, it would be useful to keep the resistances for short to medium term (1, 3, 7 days): this is reflected in a rapid consolidation of the mass, a quick release from the caissons and a quick production procedure; furthermore it is not always indispensable to keep the resistance values at 28 days higher than 110 MPa, as this value is much higher than the average limits for AR concrete. On the other hand a simple reduction of the cement content (with regards to the water of the mixture and/or the aggregates present) using the other parameters reported in the quoted patent application does not bring the results wished for in terms of rheology and thus not making the concrete suitable for structural use due to an excessive plasticity. The need for concrete that presents high resistance remains therefore unsolved and there is no evident solution, especially in the short and medium term, even without additions with pozzolanic activity and using a moderate quantity of cement, so as to avoid undesirable phenomena of shrinkage and reduce the total cost of the product.

SUMMARY OF THE DISCLOSURE

The present disclosure is to set out a formula for a concrete with the following characteristics:
1) absence of significant quantities of type II additions (for example silica fume)
2) mechanical resistance at 16 hours higher than 50 MPa and a development of mechanical resistance to compression so as to guarantee the values reported in the following table

TABLE II performance requirements in terms of the development of the mechanical resistances.

| | Expiry hours[h] and days [d] | | | |
|---|---|---|---|---|
| | 16 h | 1 d | 2 d | 7 d |
| Rc [MPa] | ≧50 | ≧60 | ≧70 | ≧80 |

3) the cement quantity between 15% and 22% in weight with respect to the total weight of the solid mixture, and anyway so that the dosage is not higher than 500 Kg of cement per $m^3$ of mixture.

A further object of the present disclosure is to set out the formula for self-compacting concrete that satisfies the characteristics in points 1), 2) and 3) described above.

Another objective of the disclosure is to obtain quick hardening fibre reinforced concrete without significant additions of type II, for example silica fume.

It has been surprisingly found that it is possible to reach the objectives described above by using an optimum granulometric composition of the solid cement mixture and limestone aggregate. In particular, it has been found that, if such a granulometric composition is used, the passing percentage of composition (intended as percentage in weight of particles of the mixture passing through the sift, as a function of the dimensions of the sieve's mesh) respects the curve built according to the following table III and it is possible to obtain a high performance concrete, having the mechanical resistance that develops in time as indicated in Table II, without the addition of significant quantities of pozzolanic type additions, and reducing substantially the cement content with regards to the known technique.

TABLE III

Granulometric distribution of the mixture

| Diameter (mm) | Passing % (lower limit) | Passing % (higher limit) |
|---|---|---|
| 16.00 | 100 | 100 |
| 12.50 | 92 | 98 |
| 10.00 | 82 | 94 |
| 8.00 | 78 | 90 |
| 6.30 | 72 | 80 |
| 4.00 | 62 | 70 |
| 3.15 | 58 | 65 |
| 2.00 | 50 | 60 |
| 1.00 | 42 | 50 |
| 0.40 | 35 | 45 |
| 0.20 | 32 | 40 |
| 0.10 | 28 | 36 |
| 0.01 | 12 | 20 |
| 0.005 | 8 | 16 |

DETAILED DESCRIPTION OF THE PREFERRED EMBODIMENT

Object of the disclosure is therefore mixture of solid cement and limestone type additions, substantially lacking the addition of materials of latent hydraulic activity, for example silica fume, characterized by its granulometric distribution represented in table III.

All cements according to EN 197-1 standard can be used to prepare the solid mixture of the disclosure. The cement content is generally between 15% and 22% in weight with respect to the cement and aggregates (excluding from the calculations possible additives that could be present); preferably it is comprised between 19 and 21%, using cement type I CEM 52.5 R.

The aggregates present preferably a D. Max comprised between 12 and 20 mm, determined according to the standard UNI EN 933-1.

With the expression "substantially lacking the addition of materials of latent hydraulic activity", one means that such additions, if at all present, are generally less than 5% in weight and with respect to the cement and preferably less than 2%.

The mixture can include additives normally used in high resistance concrete, such as for example superfluidising additives, in quantities currently used, for example between 0.4% and 1.5% expressed as a dry substance on the cement.

When concrete is made up from the above mentioned solid mixtures, the water/cement ratio used is preferably comprised between 0.30 and 0.34 (preferably between 0.31 and 0.32). With regards to the known technique described in MI2001A002480, the present disclosure has allowed the drastic reduction of the cement quantity necessary to make AR and HPC concretes, reducing in this way the possible phenomenon of shrinkage and the total cost of the product.

Amongst the further advantages that AR and HPC concretes present according to the present disclosure is that they have the characteristic of being waterproof. Furthermore if fibres of polymeric type are added, for example polypropylene fibres, preferably from 0.2 up to 0.5% in weight with respect to the solid mixture, they present high resistance to fire.

Experimental Part

The materials used for the experiment were:

Cement

A CEM cement type I class 52.5 R, in conformity with EN 197-1 standard and having a Blaine grade of about 4900 cm²/g.

Additives

Commercial acrylic additives (Axim, Driver 3, Creative L) were used.

Mixing Water

Mixing water in conformity with UNI-EN 1008 standard was used.

Aggregates

Crushed limestone in conformity with UNI EN 1097 standard characterised by a compact crystalline structure, from the Rezzato (BS) quarry which has a chemical composition indicated in table IV; in the same table is reported also the average value of water absorption.

Figure 1:
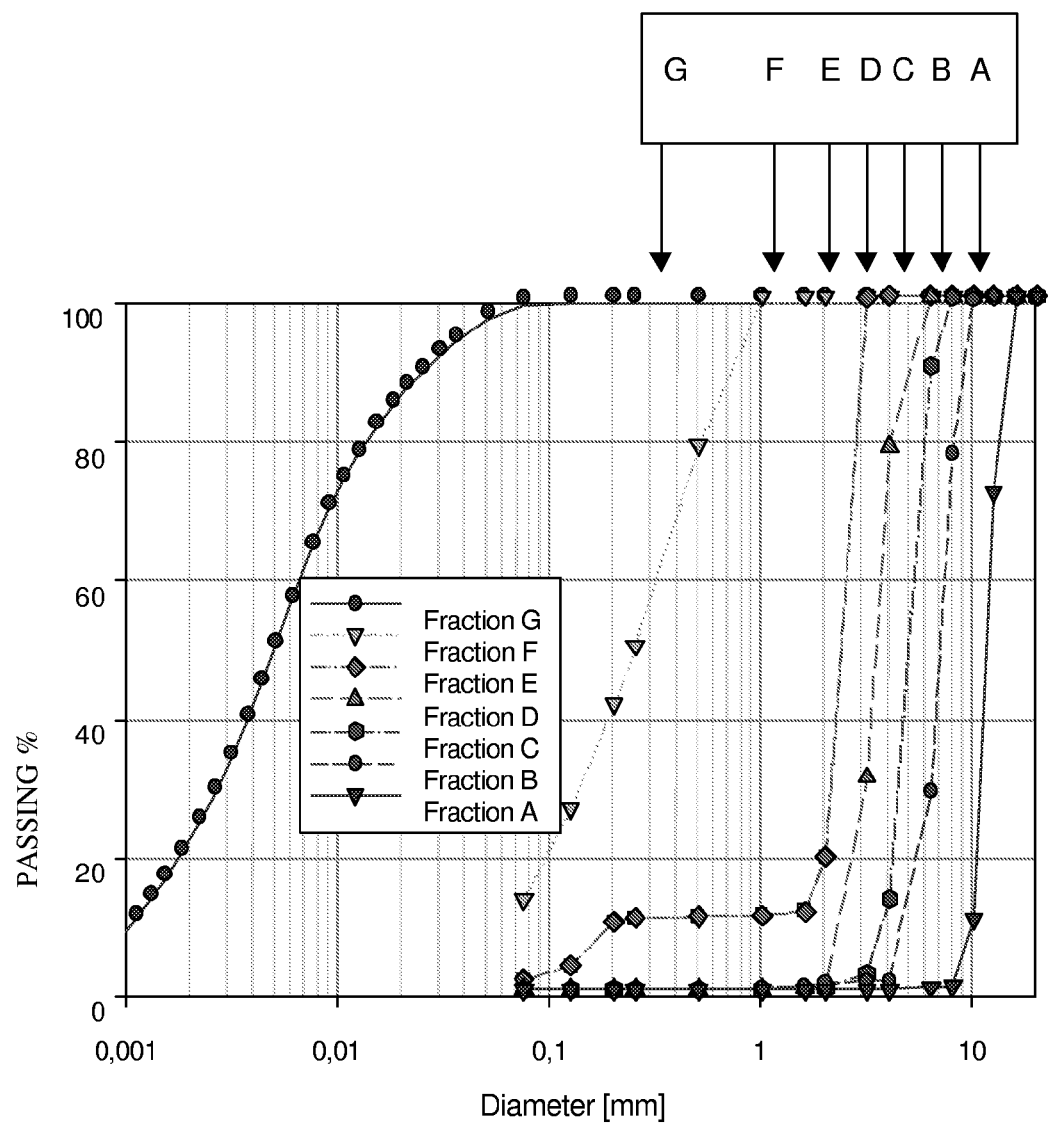
FIG. 1 is a chart depicting the granulometric distribution of the fractions of aggregates used in the "LSC" mixture of the disclosure.

In FIG. 1 the granulometric composition of each fraction used to manufacture the solid aggregate mixture are reported.

TABLE IV

Chemical composition and average value of water absorption of the limestone aggregate according to the disclosure

| | |
|---|---|
| $CaCO_3$ | 98.61% |
| $Mg\ CO_3$ | 0.87% |
| $SiO_2$ | 0.13% |
| $Al_2O_3$ | 0.01% |
| $Fe_2O_3$ | 0.03% |
| $Na_2O$ | 0.12% |
| $K_2O$ | 0.07% |
| T.O.C. | 0.020.% |
| Absorb. $H_2O$ | 0.28% |

Mixture Composition

The concrete mixture according to the disclosure comprises:
- 20.4% in weight of cement type I CEM 52.5 R, calculated with regards to the cement and limestone aggregate with D. Max from 12 to 20 mm.
- silica fume lower than 2%, of the weight of the cement,
- an acrylic superfluidising base 1.2% expressed as a dry substance on cement
- water/cement ratio: 0.31.

The above mentioned percentages of cement and aggregate are referred to the sum in weight of these two components, excluding from the total other possible components of the mixture. Preferably the limestone aggregate should have a content of $CaCO_3$ higher or at least equal to 95% in weight with respect to the aggregate mass.

Typical "LSC" Mixture According to the Disclosure

The typical cement and limestone aggregate mixture are reported in table V according to the disclosure.

TABLE V

Composition of the solid mixture

| | |
|---|---|
| Aggregate fraction A | 14.38 |
| Aggregate fraction B | 11.55 |
| Aggregate fraction C | 7.8 |
| Aggregate fraction D | 5.87 |
| Aggregate fraction E | 15.7% |
| Aggregate fraction F | 17.22% |
| Aggregate fraction G | 7.09% |
| Cem I 52.5R | 20.4% |

This resulting composition presents a granulometric distribution curve in accordance with the data in table III.

Figure 2:
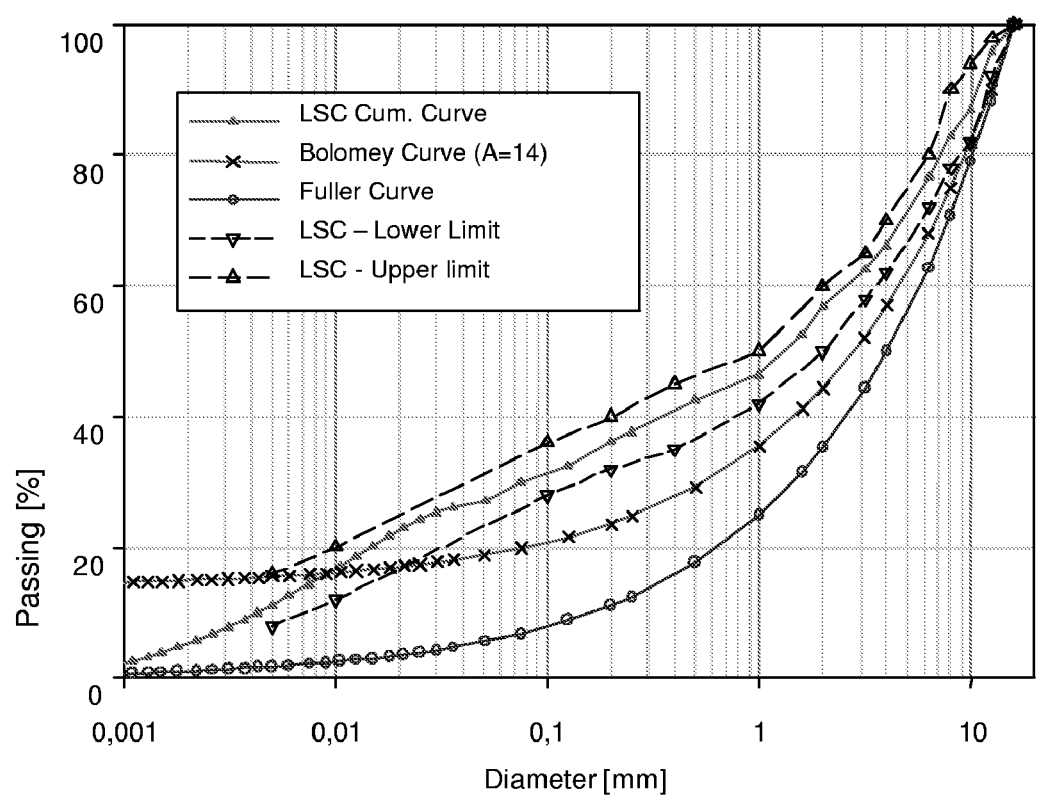
FIG. 2 is a chart depicting the cumulative granulometric distribution of the solid cement mixture and aggregates, the composition of which is reported in table 5. Also the higher and lower limits are reported as indicated in table III. In the same FIG. 2 the Fuller and Bolomey curves are reported as a comparison. One can observe that the profile of the curve of the disclosure is different to the traditional ones (Fuller and Bolomey).

In FIG. 2, the cumulative granulometric distribution of the solid mixture and aggregate reported in table V is reported. Furthermore the lower and higher limits indicated in table III are also reported. In the same FIG. 2, the Fuller and Bolomey curve are reported for comparative purposes.

Preparation of the Mixture According to Known Techniques for a Comparison with the Product According to the Disclosure Represented by the LSC Mixture.

The mixture of cement and aggregate reported in table VI describes the mixture to be compared and is prepared according to the patent application MI2001A002480.

TABLE VI

| Composition of the solid mixture (comparison) | |
| --- | --- |
| Aggregate fraction. 00 | 22.8% |
| Aggregate fraction. 1 | 35.2% |
| Aggregate fraction. 2 | 10% |
| Cement* 52.5 R type I | 32% |

Figure 3:
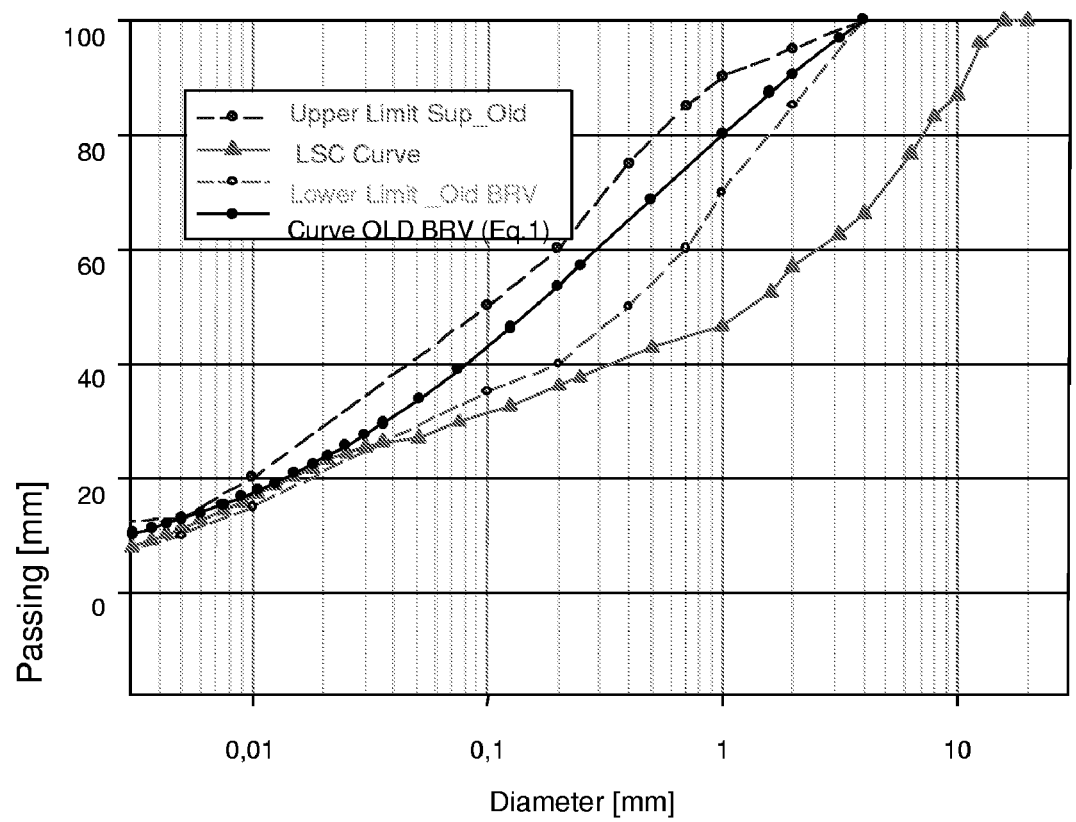
FIG. 3 is a chart depicting the granulometric distribution of the LSC mixture is compared to the granulometric distribution used to manufacture the solid mixture according to the known art. In particular the higher and lower limits of such granulometric distribution.

In FIG. 3 the granulometric distribution of the LSC mixture is compared with the granulometric distribution used to manufacture the solid mixture (Old BRV), the composition of which is reported in table VI. As one can observe, there are significant differences in the particle diameter that range between 0.1 and 10 mm.

Preparation of the Mixture for Comparative Tests.

With the solid mixture described in table VI, a mixture was prepared with a water/binder ratio of 0.26 and superfluidising acrylic additive 0.6% as a dry substance on the binder (Super flux 2003)

The preparation of the mixtures was carried out in a forced high efficiency sand mixer. Cement, water and additive are introduced in the first phase of the mixing, for about 3 minutes. Then the limestone aggregate is added and the mixing is prolonged for a further 7 minutes until the required consistency is reached.

Characterisation of the Product According to the Disclosure and Comparison with Products According to Known Techniques.

1. Rheological Performance

In the following table VII, the spreading (fluidity) values according to UNI 11040 standard found in the above mentioned mixtures are reported.

TABLE VII

| Rheological characteristics of the mixtures under examination. | | | |
| --- | --- | --- | --- |
| | Reference standards | Acceptance | Result (LSC mixture) |
| Fluidity | UNI 11041 | >600 mm | 690 mm |
| Spreading time (to reach a diameter of 500 mm) | UNI 11041 | <12 seconds | 5 seconds |
| Confined sliding (L shaped box) | UNI 11043 | h2/h1 > 0.8 | h2/h1 = 1 |
| Confined sliding (U shaped box) | UNI 11044 | Δh < 30 mm | Δh = 0 |

All specimens, prepared in metal moulds 100×100×100 mm, were removed after 24 hours from casting and put to mature in water at 20±2° C. for a preset time.

2. Hygrometric Shrinkage

Hygrometric tests were carried out on the comparative and LSC mixtures according to UNI 6555 standard. In table VIII, the hygrometric shrinkage data which were noted on removed specimens after 24 hours from casting are reported. The hygrometric shrinkage was taken 1, 3 and 7 days after removal from the mould.

TABLE VIII

| Hygrometric Shrinkage | | |
| --- | --- | --- |
| Expiry [days] | Removal from mould at 24 hours from casting [με] (LSC concrete) | Removal from mould at 24 hours from casting [με] (comparative concrete) |
| Day 1 | 54 | 90 |
| Day 3 | 99 | 140 |
| Day 7 | 150 | 211 |

One can see from table VIII how the hygrometric shrinkage of the comparative concrete is much higher than the one according to the disclosure.

3. Mechanical Resistance

In the following table IX, the compression resistance values at different stages are reported.

TABLE IX

| Resistance values at compression [MPa] noted according to UNI EN 12390-3. | | | | | |
| --- | --- | --- | --- | --- | --- |
| | Expiry Hours (h) o days (d) | | | | |
| | 16 h | 1 d | 2 d | 3 d | 7 d |
| Rc [MPa] | 63.5 | 74 | 80.5 | 83 | 89.5 |

4. Thermal Increase

Figure 4:
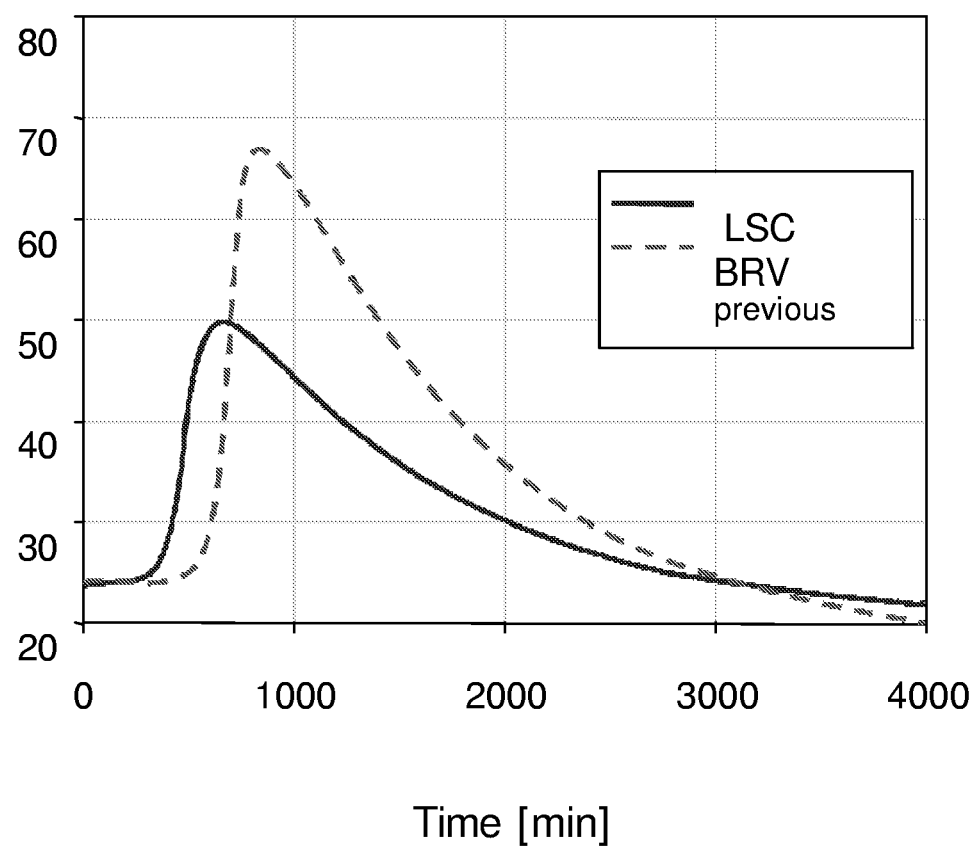
FIG. 4 is a chart plotting the temperature increase in semi adiabatic conditions of the LSC concrete and of the comparative concrete according to the known art are reported.

In FIG. 4, the thermal increase of the LSC specimens during the first hours from casting is reported. The temperature increase was observed at the centre of the cubic specimens (cubes with sides of 150 mm) poured in a polystyrene mould and later sealed with a polystyrene cover. For comparative purposes, thermal increase of comparison specimens registered under the same experimental conditions (semi adiabatic thermal increase) are reported.

From FIG. 4, one can see an appreciable reduction of the thermal increase at peak levels (about 50° C.) similar to the higher concrete limit with ordinary resistance.

5. High Temperature Resistance

In order to confer resistance at high temperatures specifically resistance to explosive breakaway, the composition of the LSCs was modified foreseeing the use (0.24% of the solid mixture) of polymeric fibres (length=200 mm, Φ=200-250 μm).

Figure 5:
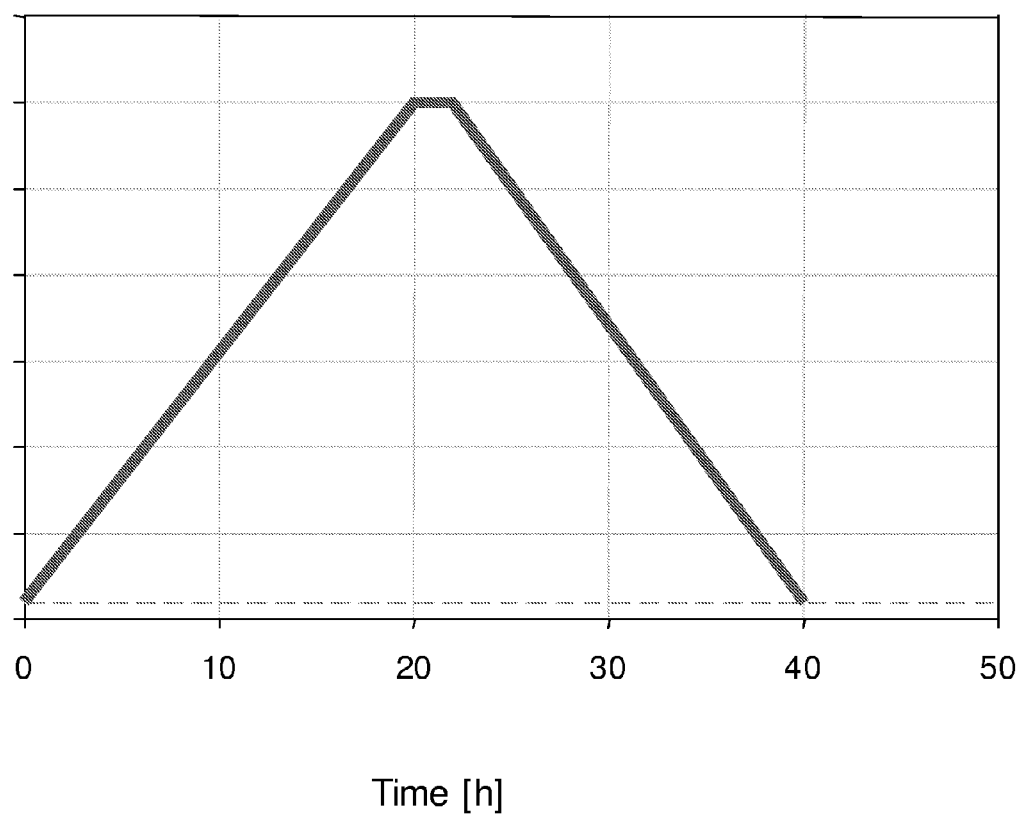
FIG. 5 is a chart which depicts the slow heating/cooling cycle is reported. The heating is brought up to 30° C./hour whilst the cooling at 15° C./hour. The following maximum temperatures are reached—150, 300, 450, 600, 750° C.
Figure 6:
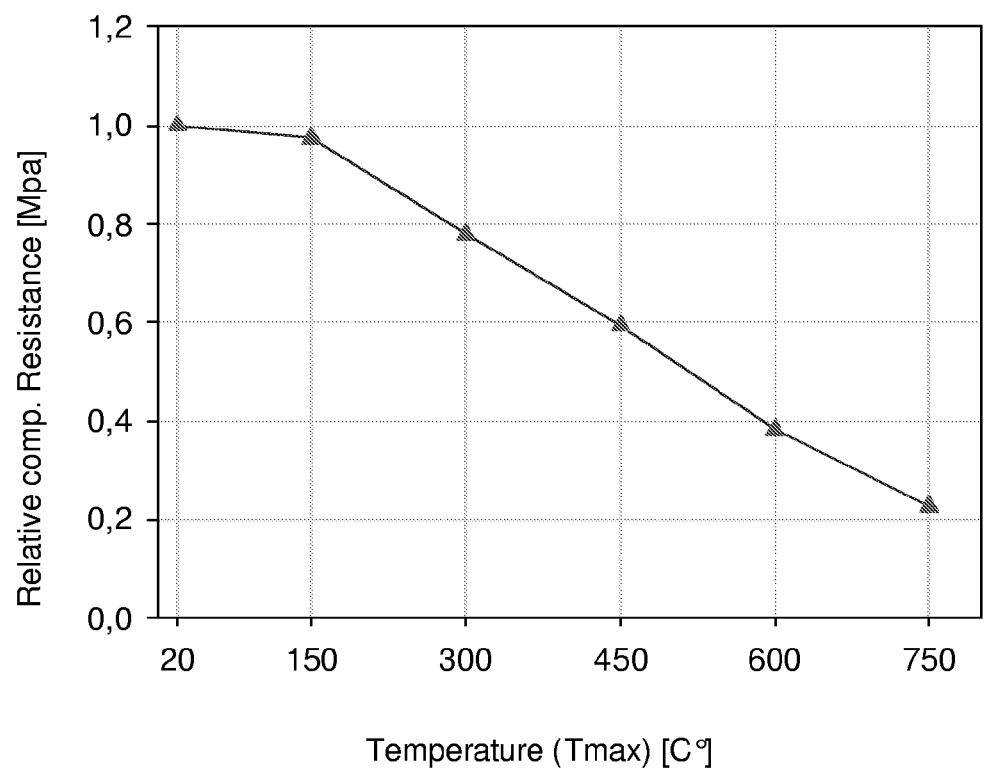
FIG. 6 is a chart depicting the pattern of the resistances to the residue compression is reported, observed after the thermal cycle and referred to the test resistance before subjecting them to the thermal cycle.

Modified cylindrical specimens (diameter 36 mm; h=110 mm) of LSC have undergone two test procedures:

1) slow heating/cooling cycle as the cycle reported in FIG. 5. At the end of the cycle, the compression resistance of the specimen was measured (see FIG. 6). The exposure at 600° C. for 2 hours entails a resistance reduction of up to 40%; this value of about 40 MPa is to be considered sufficient to affirm appreciable structural properties of the LSC concrete 2) Thermal shock: the specimens, at an ambient temperature (20±2° C.), were introduced in a muffle at 600° C. for 30 minutes. After cooling back to an ambient temperature, a relative residue resistance of 0.39 was observed, substantially equal to those subjected to a slow cycle with $T_{max}$=600° C. The specimens of LSC lacking polymeric fibres, subjected to a thermal shock have shown the well known phenomenon of explosive breakage due to the overpressure of water steam generated in the material's porous system.

6. Water Proof Characteristics

Figure 7:
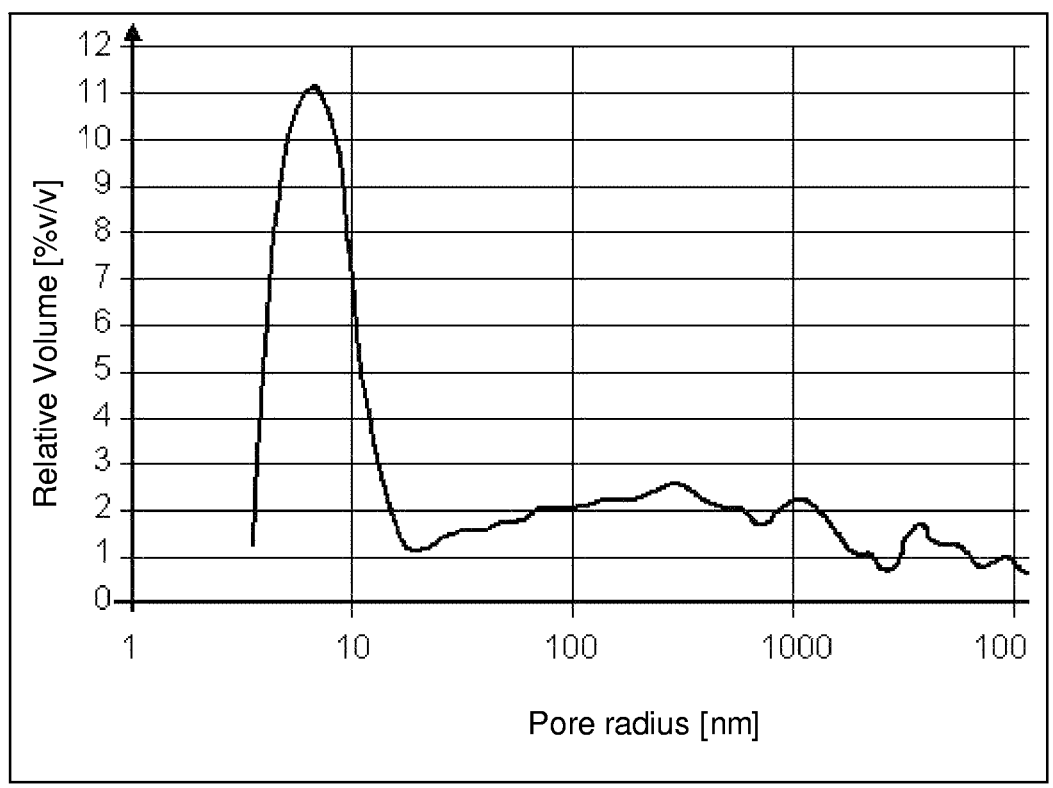
FIG. 7 is a chart depicting the porous differential distribution observed by the intrusion of Hg is reported.

The LSC concrete is characterized by a very compact porous structure. The total porosity observed by mercury intrusion is equal to about 3.1% in volume and is distributed in a range of very small pores (FIG. 7). For this reason the LSC concrete, when subjected to a vacuum penetration test (UNI EN 12390-8) does not show any water advance front.

Subjected to a proofing test with $O_2$, the LSC concrete has shown a value equal to $7.61*10^{-19}$.

The invention claimed is:

1. A solid cement and limestone aggregates mixture with no hidden hydraulic activity, wherein the cement content is between 15% and 22% by weight, and the granulometric distribution is represented by a curve that corresponds to the values shown in the following table:

| Diameter (mm) | Passing % (lower limit) | Passing % (higher limit) |
| --- | --- | --- |
| 16.00 | 100 | 100 |
| 12.50 | 92 | 98 |
| 10.00 | 82 | 94 |
| 8.00 | 78 | 90 |
| 6.30 | 72 | 80 |
| 4.00 | 62 | 70 |
| 3.15 | 58 | 65 |
| 2.00 | 50 | 60 |
| 1.00 | 42 | 50 |
| 0.40 | 35 | 45 |
| 0.20 | 32 | 40 |
| 0.10 | 28 | 36 |
| 0.01 | 12 | 20 |
| 0.005 | 8 | 16. |

2. The solid mixture for preparation of concrete according to claim 1, which has the following development of mechanical resistance in time: after 16 hours $\geq$50 MPa; after 1 day$\geq$60 MPa; after 2 days$\geq$70 MPa; and which comprises cement in conformity with the European standard 197-1 and limestone aggregates.

3. The solid mixture according to claim 1, wherein the cement is CEM I 52.5 R.

4. The solid mixture according to claim 1, wherein cement quantities are between 19% and 21% by weight.

5. The solid mixture according to claim 1, wherein the limestone aggregates are made of crushed limestone with a content of $CaCO_3$ higher or equal to 95% by weight with regard to the total weight of the aggregates.

6. The solid mixture according to claim 1, wherein the limestone aggregates have a maximum diameter D Max between 12 and 20 mm.

7. The solid mixture according to claim 1, comprising acrylic additives.

8. The solid mixture according to claim 7, wherein the acrylic additives are between 0.4% and 1.5% by weight with regard to the weight of the cement.

9. The solid mixture according to claim 7, wherein the acrylic additives are between 0.8% and 1.3% by weight with regard to the weight of the cement.

10. The solid mixture according to claim 1, further comprising polymeric fibres.

11. The solid mixture according to claim 10, wherein the polymeric fibres are propylene fibres.

12. The solid mixture according to claim 10, wherein the polymeric fibres are between 0.2 and 0.5% by weight.

13. The cement mixture for the preparation of high resistance or high performance concrete, lacking additions with latent hydraulic activity, comprising a solid mixture according to claim 1, mixed with water, with a water/cement ratio between 0.30 and 0.34.

14. The cement mixture according to claim 13, wherein the water/cement ratio is between 0.31 and 0.32.

15. The cement mixture according to claim 13, wherein the cement quantity is less than 500 Kg/m$^3$.

16. The cement mixture according to claim 13, wherein the high resistance or high performance concrete is resistant to fire.

17. The cement mixture according to claim 13, wherein the high resistance or high performance concrete is waterproof.

18. The concrete obtained from a cement mixture according to claim 13.

19. The cementitious product obtained with a cement mixture according to claim 13.

* * * * *